United States Patent
Barker et al.

(10) Patent No.: US 9,429,105 B2
(45) Date of Patent: Aug. 30, 2016

(54) ROCKET VEHICLE WITH INTEGRATED ATTITUDE CONTROL AND THRUST VECTORING

(71) Applicant: Raytheon Company, Watham, MA (US)

(72) Inventors: Michael A Barker, Tucson, AZ (US); Dean W Smith, Tucson, AZ (US); Edward J Marquart, Tucson, AZ (US); Joseph R Corrado, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 672 days.

(21) Appl. No.: 13/912,837

(22) Filed: Jun. 7, 2013

(65) Prior Publication Data
US 2014/0360157 A1 Dec. 11, 2014

(51) Int. Cl.
*F02K 9/80* (2006.01)
*F42B 10/66* (2006.01)

(52) U.S. Cl.
CPC *F02K 9/80* (2013.01); *F42B 10/66* (2013.01)

(58) Field of Classification Search
CPC .............. F02K 9/80; B64G 1/24; B64G 1/26; B64G 2001/245; B64C 15/00; G05D 1/08; F42B 10/66
See application file for complete search history.

(56) References Cited

U.S. PATENT DOCUMENTS

| | | | | |
|---|---|---|---|---|
| 3,540,678 A | * | 11/1970 | Bittner | G01C 21/16 244/3.2 |
| 3,806,063 A | * | 4/1974 | Fitzgerald | F02K 9/805 137/805 |
| 3,946,968 A | * | 3/1976 | Stallard | F41G 7/22 244/3.21 |
| 4,131,065 A | * | 12/1978 | Dietz | F42B 15/00 102/377 |
| 4,173,785 A | * | 11/1979 | Licata | F41G 7/36 244/3.2 |
| 4,837,699 A | * | 6/1989 | Smay | G05D 1/0883 244/169 |
| 4,991,393 A | | 2/1991 | Otten et al. | |

(Continued)

OTHER PUBLICATIONS

International Search Report and Written Opinion from corresponding International Application No. PCT/US2013/075664, mailed on Oct. 14, 2014.

*Primary Examiner* — Carlos A Rivera
(74) *Attorney, Agent, or Firm* — Renner, Otto, Boisselle & Sklar, LLP

(57) ABSTRACT

A rocket vehicle includes a controller that integrates operation of a variable-vector main thruster and attitude control thrusters. When the main thruster is firing and roll is commanded, the controller can provide roll moment by firing only a single attitude control thruster, while changing the thrust vector of the main thruster to offset any pitch/yaw moments induced by the firing of the single attitude control thruster. The single attitude control thruster may be a thruster on the leeward side of the rocket vehicle. Since there is a lower wall pressure on the leeward side of the rocket vehicle, the thruster efficiency is improved by accomplishing roll by use of a single thruster (which may be one of a pair of thrusters used to achieve roll in one direction). A significant reduction in fuel use may be accomplished.

16 Claims, 3 Drawing Sheets

(56) References Cited

U.S. PATENT DOCUMENTS

| | | | | |
|---|---|---|---|---|
| 5,259,569 | A | * | 11/1993 | Waymeyer ............ G05D 1/107 244/3.21 |
| 6,260,805 | B1 | * | 7/2001 | Yocum, Jr. ............ B64G 1/26 244/164 |
| 6,296,207 | B1 | * | 10/2001 | Tilley .................... B64G 1/242 244/165 |
| 7,185,857 | B2 | | 3/2007 | Potter et al. |
| 2003/0042355 | A1 | | 3/2003 | Rodden et al. |
| 2009/0288389 | A1 | | 11/2009 | Kinsey et al. |
| 2010/0192539 | A1 | * | 8/2010 | Cover .................... F02K 9/08 60/204 |
| 2010/0327106 | A1 | | 12/2010 | Brinkerhoff et al. |
| 2011/0082604 | A1 | * | 4/2011 | Lam ...................... B64G 1/26 701/4 |
| 2013/0092785 | A1 | * | 4/2013 | Tournes ................. F41G 7/22 244/3.2 |

* cited by examiner

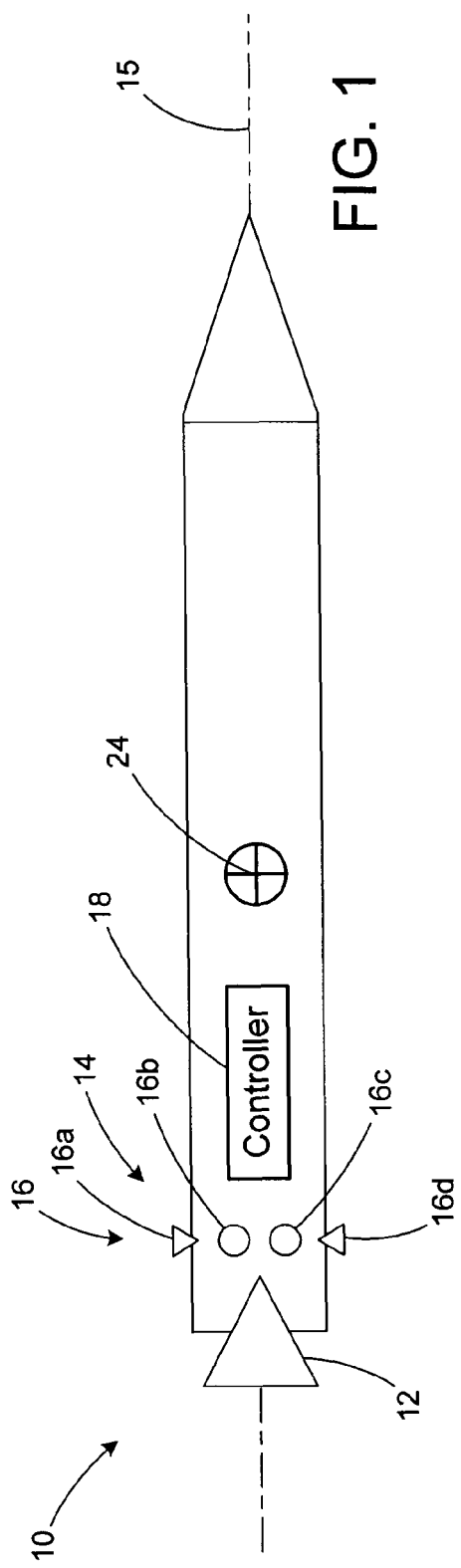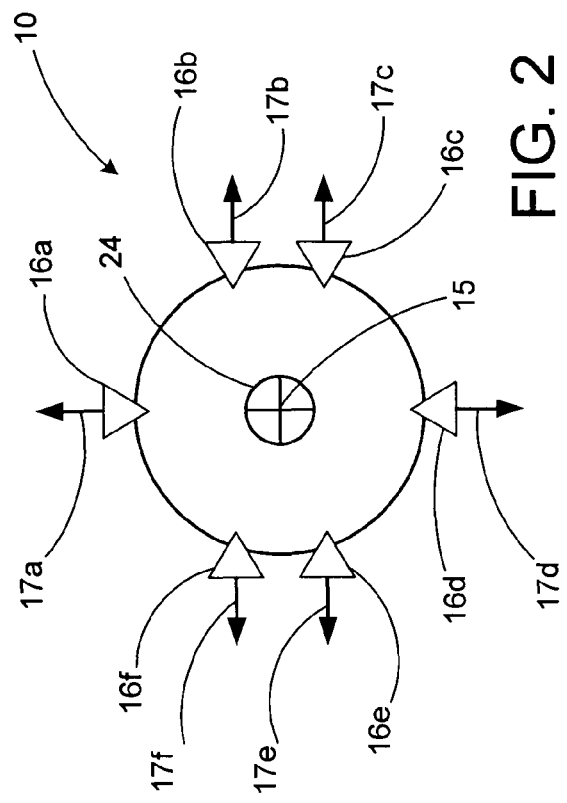

ROCKET VEHICLE WITH INTEGRATED ATTITUDE CONTROL AND THRUST VECTORING

GOVERNMENT RIGHTS

This invention was made with United States Government support under Contract Number HQ0147-11-C-0009-P00007 with the Missile Defense Agency. The United States Government has certain rights in this invention.

BACKGROUND OF THE INVENTION

1. Technical Field of the Invention

The invention is in the field of rocket vehicles, in particular attitude control systems and methods.

2. Description of the Related Art

For some rocket vehicles, such as missiles, it is desirable to steer the missile or otherwise control its attitude and course. It is also in general desirable to minimize the amount of fuel required for a missile, such as a long-range missile.

SUMMARY OF THE INVENTION

A rocket vehicle includes an attitude control system which allows, in at least some circumstances, firing a reduced number of attitude control thrusters, using thrust vector control to compensate for the use of a reduced number of attitude control thrusters.

According to an aspect of the invention, a rocket vehicle includes: a fuselage; a main thruster coupled to the fuselage, wherein the main thruster provides forward thrust to the rocket vehicle; an attitude control system that includes pairs of attitude control thrusters for providing roll moments in opposite directions; and a controller operatively coupled to the attitude control system and the main thruster. The main thruster is a vector control thruster that allows variation in thrust direction of the main thruster. The controller changes the thrust direction of the main thruster to compensate for the lateral moment created when developing the roll moment by using only one attitude control thruster of the one of the pairs of attitude control thrusters.

According to another aspect of the invention, a method of guiding a rocket vehicle includes the steps: firing a variable-vector main thruster of the vehicle to provide main thrust to the rocket vehicle; and while the main thruster is firing, firing an attitude control thruster to roll the rocket vehicle, while also changing a thrust vector of the main thruster to compensate for pitch and/or yaw induced by the firing of the attitude control thruster.

According to yet another aspect of the invention, a method of guiding a rocket vehicle includes the steps: determining, using a controller of the rocket vehicle to determine whether to roll the rocket vehicle by either 1) firing both of a pair of diametrically opposed attitude control thrusters of the rocket vehicle, or 2) firing only one of the pair of attitude control thrusters, while also changing a thrust vector of a main thruster of the rocket vehicle to compensate for pitch and/or yaw induced by the firing of only one of the pair of attitude control thrusters; and rolling the rocket vehicle based on the determining by the controller.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various features of the invention.

FIG. 1 is a side schematic view of a rocket vehicle according to an embodiment of the present invention.

FIG. 2 is a cross-sectional view of the rocket vehicle of FIG. 1.

DETAILED DESCRIPTION

Figure 3:
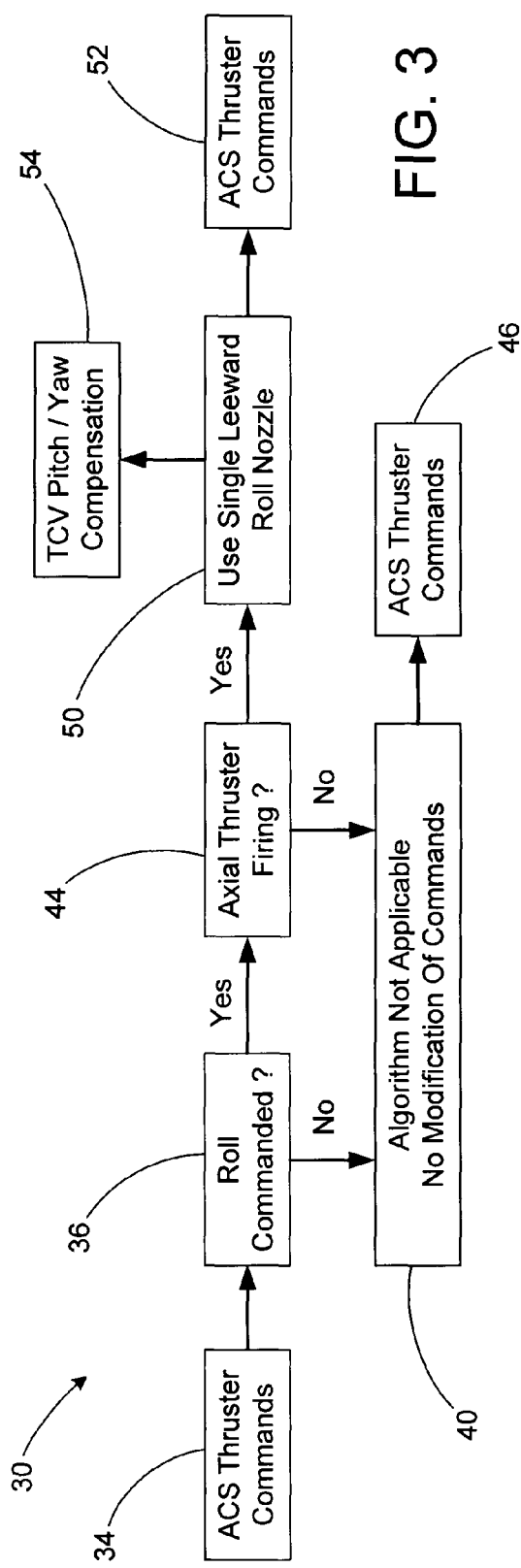
FIG. 3 is a block diagram illustrating operation of a controller of the rocket vehicle of FIG. 1.

A rocket vehicle includes a controller that integrates operation of a variable-vector main thruster and attitude control thrusters. When the main thruster is firing and roll is commanded, the controller can provide roll moment by firing only a single attitude control thruster, while changing the thrust vector of the main thruster to offset any pitch/yaw moments induced by the firing of the single attitude control thruster. The single attitude control thruster may be a thruster on the leeward side of the rocket vehicle. Since there is a lower wall pressure on the leeward side of the rocket vehicle, the thruster efficiency is improved by accomplishing roll by use of a single thruster (which may be one of a pair of thrusters used to achieve roll in one direction). A significant reduction in fuel use may be accomplished.

FIG. 1 shows a rocket vehicle 10 that includes a main thruster 12 and an attitude control system 14. The main thruster 12 may be used to provide main forward thrust to the rocket vehicle 10, providing thrust to propel the rocket vehicle forward in a direction along or near a longitudinal axis 15 of the rocket vehicle 10. The main thruster 12 may be a solid or liquid fuel thruster, for example, and may be part of a booster stage of a multi-stage rocket vehicle. The main thruster 12 is a vector control thruster that allows variation in thrust direction of the main thruster 12. The main thruster 12 may have a nozzle that is tilted, by any of a variety of known mechanisms, to controllably vary the direction of its output thrust. Suitable actuators may be used to tilt the nozzle, to give one example of a nozzle-tilting mechanism.

The attitude control system 14 is used to steer the rocket vehicle 10. As described in greater detail below, the attitude control system 14 includes a series of attitude control thrusters 16. The attitude control thrusters 16 can be used to provide pitch, yaw, and/or roll moments to the rocket vehicle 10 as needed, and may use any of a variety of mechanisms to produce thrust, examples being solid fuel thrusters, liquid fuel thrusters, or thrusters that eject pressurized gas from a pressurized gas supply. Suitable valves and other associated equipment may be used to control flow of gas from the attitude control thrusters 16.

The attitude control system 14 also includes an autopilot or controller 18 for providing signals to the attitude control thrusters 16, in order to accomplish the desired changes in pitch, yaw, and/or roll of the rocket vehicle 10. The attitude control thrusters 16 are mounted on/in the rocket vehicle 10, which also contains the autopilot/controller 18. Feedback may be provided by to the autopilot/controller 18 regarding the position and orientation of the rocket vehicle 10, and/or the autopilot 18 may be able to receive communications from outside the rocket vehicle 10, for example receiving data and/or instructions for steering the rocket vehicle 10.

The rocket vehicle 10 may be any of a variety of different types of rocket vehicles. The main thruster 12 and the attitude control system 14 may be parts of a rocket booster that is used to drive the rocket vehicle 10 in Earth's atmosphere, for example on the way to space. The rocket vehicle 10 may be an intercontinental ballistic missile (ICBM) or a reusable manned space vehicle, to give two non-limiting examples. The rocket vehicle 10 may be a ground-launched rocket vehicle.

FIG. 2 shows further details regarding one possible way of arranging the attitude control (divert) thrusters 16. Six attitude control thrusters 16a, 16b, 16c, 16d, 16e, and 16f are shown in FIG. 2, located on the periphery of the rocket vehicle 10. The thrusters 16a and 16d are diametrically opposed at the top and the bottom of the figure, and are used to provide thrust for pitching the rocket vehicle. These thrusters have their thrust directions 17a and 17d intersecting the rocket vehicle longitudinal axis 15. Firing one or the other of the thrusters 16a and 16d causes the rocket vehicle 10 to pitch in a desired direction.

The other four thrusters 16b, 16c, 16e, and 16f are used to provide thrust for yaw and roll. These thrusters have their thrust directions 17b, 17c, 17e, and 17f offset from the longitudinal axis 15, which runs through a center of gravity 24 of the rocket vehicle 10. Pure yaw is accomplished by either firing the thrusters 16b and 16c, or the thrusters 16e and 16f. Pure roll may be accomplished by either firing the thrusters 16b and 16e, or the thrusters 16c and 16f. Suitable combinations of the above firings of the divert (attitude control) thrusters 16a-16f may be used to achieve desired combinations of pitch, yaw, and/or roll.

Other configurations of the attitude control thrusters 16 are possible. There may be fewer attitude control thrusters (for example, four thrusters), or more attitude control thrusters, than what is shown in FIG. 2. What is important with regard to the present invention is that the attitude control thrusters 16 be capable of causing roll of the rocket vehicle 10.

As noted above, one possibility for applying a roll moment to the rocket vehicle 10 is to fire an opposed pair of the divert thrusters 16, in the illustrated embodiment either the thrusters 16b and 16e, or the thrusters 16c and 16f. However, when the rocket vehicle is operating in atmosphere, one of the opposed pair of thrusters may be on a windward side of the rocket vehicle 10, facing the force of onrushing air, while the other of the thrusters may be on the leeward side of the rocket vehicle 10, not facing the resistance of the oncoming atmosphere. Since a thruster on the leeward side of the rocket vehicle 10 has a lower wall pressure to overcome than does a thruster on the windward side, it is more advantageous to accomplish roll using only one of the divert thrusters 16 because the nozzle of the leeward thruster operates more efficiently. Using a single thruster of the opposed pair may be combined with a suitable movement of the main thruster 12, in order to avoid inducing an unwanted pitch or roll moment.

FIG. 3 shows a block diagram illustrating one embodiment for carrying out this process 30 of possibly altering the accomplishment of roll of the rocket vehicle 10. The functionality shown in FIG. 3 may be carried out as part of the controller 18 or other part of the attitude control system 14. The process 30 begins with receipt of the (unaltered) attitude control system commands at 34. In block 36 the commands are checked to see if roll has been commanded. If roll has not been commanded, then the algorithm and above-described process is terminated at block 40. Otherwise, in block 44 a determination is made as to whether the main thruster 12 (FIG. 1) is currently firing. If the main thruster 12 is not currently firing, then the process is again terminated (block 40). Termination of the process results in the use of the still unaltered attitude control system commands (block 46).

If both roll has been commanded, and the main thruster 12 is firing, then the attitude control system commands are altered, at block 50, to use only a single divert thruster to achieve the desired roll moment, the divert thruster that is on the leeward side of the rocket vehicle 10. This revised (altered) divert thrust command is indicated at 52. The leeward side of the rocket vehicle 10 may be determined using a suitable orientation sensor that may be a part of the controller 18, or may be operatively coupled to the controller 18. As indicated at block 54, a command is also sent to the main thruster 12 to alter the direction of thrust in the main thruster 12 to compensate for yaw and/or pitch that would otherwise be induced by firing only the leeward roll divert thruster. In addition, the alteration of the direction of thrust from the main thruster 12 may also compensate for alteration in thrust from the single divert thruster, for example an increase in thrust to compensate in whole or in part for using only a single roll thruster.

The process 30 may include other steps, for example altering the attitude thruster roll commands only when the rocket vehicle 10 is in atmosphere, as opposed to being in space. A determination may be made that the rocket vehicle 10 is in atmosphere by any of a number of suitable devices or processes, for example by use of an altimeter, or by determining altitude from flight time and a known flight plan.

Figure 4:
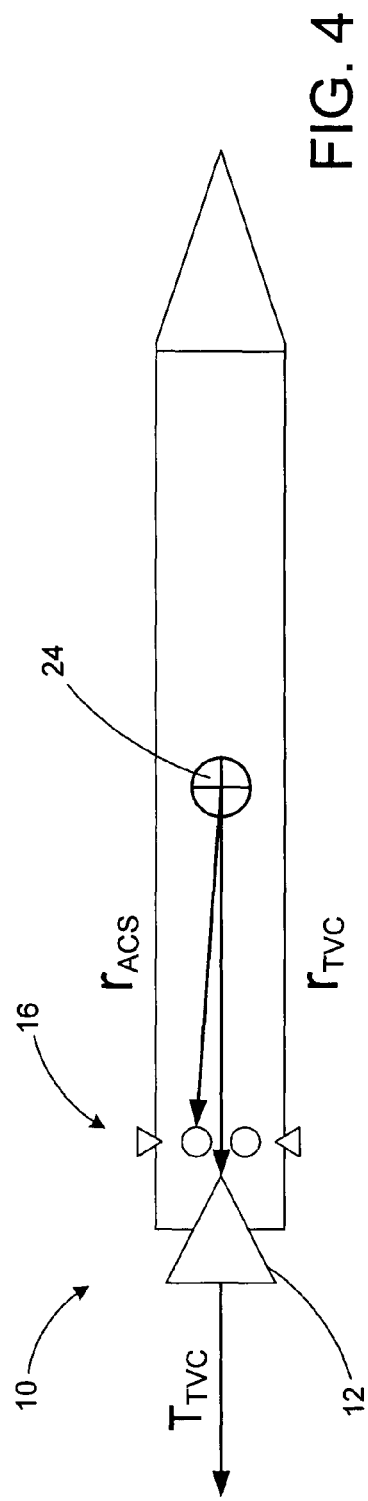
FIG. 4 is a side schematic view of the rocket vehicle of FIG. 1, illustrating vectors used in thrust vectoring during roll.
Figure 5:
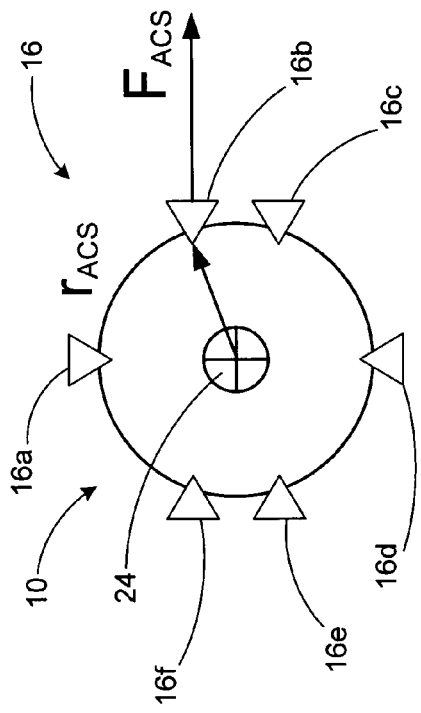
FIG. 5 is a cross-sectional view of the rocket vehicle of FIG. 4.

With reference to FIGS. 4 and 5, the compensating tilting of the main thruster 12 may be determined by first determining the pitch and yaw moments $M_{ACS}$ generated by the single attitude control thruster used to accomplish the roll:

$$M_{ACS} = r_{ACS} \times F_{ACS} \tag{1}$$

where $r_{ACS}$ is the vector from the rocket vehicle center of gravity 24 to the attitude control thruster that is fired to produce the roll moment, and $F_{ACS}$ is the thrust vector of the attitude control thruster that is fired to produce the roll moment. This moment $M_{ACS}$ is set equal to the change of moment by alteration of the thrust vector of the main thruster 12:

$$M_{ACS} = r_{TVC} \times F_{TVC} \tag{2}$$

where $r_{TVC}$ is the vector from the rocket vehicle center of gravity 24 to the main thruster 12, and $F_{TVC}$ is the thrust vector of the main thruster 12. Equation (2) is solved to determine $F_{TVC}$, giving the change in thrust vector of the main thruster 12 that is required.

Figure 7:
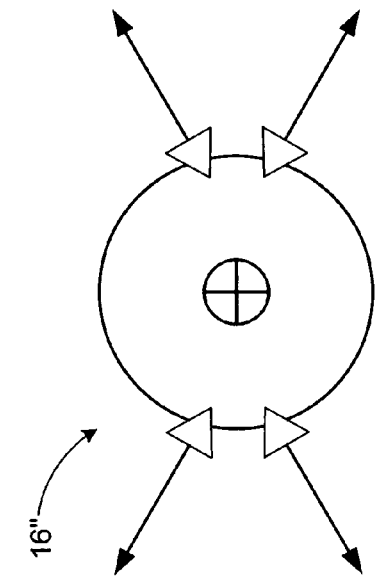
FIG. 7 is a cross-sectional view of a second alternative attitude control thruster arrangement.
Figure 6:
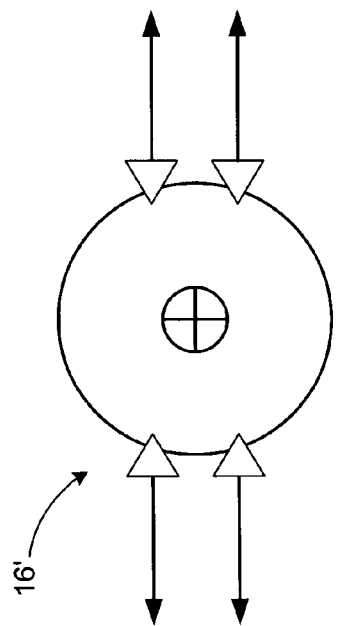
FIG. 6 is a cross-sectional view of a first alternative attitude control thruster arrangement.

FIGS. 6 and 7 show alternative attitude control thruster configurations 16' and 16", each employing only four attitude control thrusters to achieve roll, pitch, and yaw control.

Many other arrangements of attitude control thrusters are possible, with many different numbers, positions, and orientations of attitude control thrusters usable to achieve roll, pitch, and yaw control.

The rocket vehicle and method described above offer several advantages over prior systems and methods. Since the rocket vehicle 10 is configured to accomplish roll moment by only overcoming the lower back pressure on the leeward side of the rocket vehicle 10 (where possible), the attitude control system 14 may require less fuel and/or may use smaller thrusters. The fuel consumption of the attitude control system 14 may be reduced by about 10%, relative to a situation in which roll moment is achieved only by firing opposed pairs of attitude control thrusters. The reduction of demand on the attitude control system 14 is accomplished without any significant increased demand on the main thruster 12. The result is improved kinematic performance of the rocket vehicle 10.

In addition, by reducing the firing of attitude control thrusters 16 on the windward side of the rocket vehicle 10, there may be reduced jet interaction. This is because there is less jet interaction between the attitude control thrusters and the atmosphere on the leeward side of the rocket vehicle. The result may be a reduction in unexpected forces on the rocket vehicle 10 due to jet interaction.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rocket vehicle comprising:
a fuselage;
a main thruster coupled to the fuselage, wherein the main thruster provides forward thrust to the rocket vehicle;
an attitude control system that includes pairs of attitude control thrusters for providing roll moments in opposite directions; and
a controller operatively coupled to the attitude control system and the main thruster;
wherein the main thruster is a vector control thruster that allows variation in thrust direction of the main thruster; and
wherein the controller, at least when the rocket vehicle is operating in atmosphere, changes the thrust direction of the main thruster to compensate for the lateral moment created when developing the roll moment by using only one attitude control thruster of the one of the pairs of attitude control thrusters.

2. The rocket vehicle of claim 1, wherein the controller is part of an autopilot of the rocket vehicle.

3. The rocket vehicle of claim 1, further comprising an orientation sensor operatively coupled to the controller.

4. The rocket vehicle of claim 1, wherein the pairs of attitude control thrusters are each diametrically opposed on opposite sides of the rocket vehicle.

5. The rocket vehicle of claim 1, wherein the attitude control thrusters include at least four attitude control thrusters.

6. The rocket vehicle of claim 1, wherein the rocket vehicle is a multi-stage rocket vehicle.

7. The rocket vehicle of claim 1, wherein the rocket vehicle includes a booster that includes the main thruster.

8. A rocket vehicle comprising:
a fuselage;
a main thruster coupled to the fuselage, wherein the main thruster provides forward thrust to the rocket vehicle;
an attitude control system that includes pairs of attitude control thrusters for providing roll moments in opposite directions; and
a controller operatively coupled to the attitude control system and the main thruster;
wherein the main thruster is a vector control thruster that allows variation in thrust direction of the main thruster;
wherein the controller changes the thrust direction of the main thruster to compensate for the lateral moment created when developing the roll moment by using only one attitude control thruster of the one of the pairs of attitude control thrusters; and
wherein the controller, at least sometimes when roll is commanded, selectively uses only a leeward attitude control thruster of one of the pair of attitude control thrusters.

9. The rocket vehicle of claim 8, wherein the controller selectively uses the leeward attitude control thruster only when the main thruster is already firing.

10. The rocket vehicle of claim 9, wherein the controller, when only the leeward attitude control thruster is used changes the thrust direction of the main thruster to compensate for pitch moment and/or yaw moment induced by the leeward attitude control thruster.

11. The rocket vehicle of claim 8, wherein the controller is part of an autopilot of the rocket vehicle.

12. The rocket vehicle of claim 8, further comprising an orientation sensor operatively coupled to the controller.

13. The rocket vehicle of claim 8, wherein the pairs of attitude control thrusters are each diametrically opposed on opposite sides of the rocket vehicle.

14. The rocket vehicle of claim 8, wherein the attitude control thrusters include at least four attitude control thrusters.

15. The rocket vehicle of claim 8, wherein the rocket vehicle is a multi-stage rocket vehicle.

16. The rocket vehicle of claim 8, wherein the rocket vehicle includes a booster that includes the main thruster.

* * * * *